United States Patent [19]

Tamano et al.

[11] Patent Number: 5,304,578
[45] Date of Patent: Apr. 19, 1994

[54] PROCESS FOR PRODUCING URETHANE FOAM HAVING A HIGH DENSITY SKIN LAYER

[75] Inventors: Yutaka Tamano, Tokuyama; Shuichi Okuzono, Kudamatsu, both of Japan

[73] Assignee: Tosoh Corporation, Shinnanyo, Japan

[21] Appl. No.: 27,691

[22] Filed: Mar. 8, 1993

[30] Foreign Application Priority Data

Mar. 6, 1992 [JP] Japan ............................. 4-82925
Feb. 23, 1993 [JP] Japan ............................. 5-32893

[51] Int. Cl.$^5$ ............................................. C08J 9/34
[52] U.S. Cl. ................................... 521/51; 521/129; 521/130
[58] Field of Search .......................... 521/129, 130, 51

[56] References Cited

U.S. PATENT DOCUMENTS

| 3,238,154 | 3/1966 | Mosso | 521/128 |
| 3,795,636 | 3/1974 | Huffman et al. | 521/51 |

FOREIGN PATENT DOCUMENTS

| 2831026 | 1/1980 | Fed. Rep. of Germany . |
| 3102343 | 2/1982 | Fed. Rep. of Germany . |
| 2019933 | 7/1970 | France . |
| 2077388 | 10/1991 | France . |
| 1455695 | 11/1976 | United Kingdom . |

*Primary Examiner*—Morton Foelak
*Attorney, Agent, or Firm*—Oblon, Spivak, McClelland, Maier & Neustadt

[57] ABSTRACT

A process is provided for producing a polyurethane foam having a high-density skin layer by reacting a polyol with a polyisocyanate in a short time. The reaction is allowed to proceed in the presence of a blowing agent, a catalyst, and optionally an additive, the blowing agent being composed only of water, and the catalyst being an amine represented by formula (I) below and/or an organic acid salt thereof:

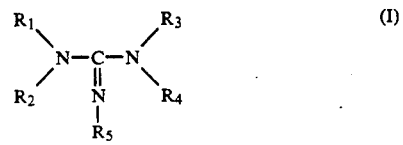

where $R_1$, $R_2$, $R_3$, and $R_4$ are, independently, an alkyl group of 1 to 12 carbons, or $R_1$ and $R_2$, and/or $R_3$ and $R_4$ may be linked to form a cycloalkyl or heterocyclic ring together with the adjacent nitrogen atom; and $R_5$ is hydrogen, an alkyl group of 1 to 12 carbons, a phenyl group, or a cycloalkyl group. This process does not use halogenated hydrocarbons which cause ozone layer destruction.

18 Claims, No Drawings

PROCESS FOR PRODUCING URETHANE FOAM HAVING A HIGH DENSITY SKIN LAYER

BACKGROUND OF THE INVENTION

Field of the Invention

The present invention relates to a process for producing a flexible, semi-rigid, or rigid polyurethane foam which has a high-density skin layer. More particularly, the present invention relates to a process for producing a polyurethane foam having a high-density skin layer, generally called a polyurethane integral skin foam, without using halogenated hydrocarbons as blowing agents.

Discussion of the Background

Polyurethane foam is usually produced by mixing a polyisocyanate instantaneously with a polyol premix containing a polyol, a catalyst, a blowing agent (a halogenated hydrocarbon and/or water) and optionally other additives to expand the mixture.

Polyurethane integral skin foams are used in many application fields owing to their light weight, soft touch, and high impact strength, for example, for interior and exterior materials of automobiles including steering wheels, air spoilers, bumpers, head rests, arm rests, and structural materials.

Methods for producing such products are known, see for example, the methods described in Keiji Iwata (ed.), "Polyurethane Jushi Handobukk (Polyurethane Resin Handbook)", pp. 220-221, and the methods described in Gunter Oertel, "Polyurethane Handbook", pp. 314-369. According to any of these methods, a polyurethane integral skin foam is produced through one injection step with one system liquid as an integrated molded product which has a high-density skin layer and a low-density core portion, with high productivity.

This advantage is achieved by a higher over-packing percent with a highly reactive polyol system by a RIM process (reaction injection molding), the system requiring CFC-11 (trichloromonofluorocarbon) as the essential blowing agent. Generally, a catalyst therefor is employed, such as triethylenediamine, tin compounds, and the like. The formation of the high-density skin layer of the integral skin foam is based on the principle that the CFC-11, a FREON type blowing agent, condenses physically at the surface layer portion of the resin in the mold because of the pressure rise owing to the high over-packing ratio and because of the low temperature at the surface layer portion owing to the absorption of the reaction heat by the mold. Therefore, the use of CFC-11 is indispensable.

The CFC-11, which is a halogenated hydrocarbon type blowing agent and is an ozone layer-destroying substance, will be prohibited internationally after the end of this century. Accordingly, a system and a production technique are strongly needed which enables the production of integral skin foam without using CFC-11 as the blowing agent. Proposed substitutes for the CFC-11 are low-boiling solvents such as pentane, and so-called alternative Freons which exhibit a lower ozone layer destruction coefficient such as HCFC-123, HCFC-22, and HCFC-141b. However, low-boiling solvents involve the disadvantage of inflammability, and the alternative Freons still exhibit a non-zero ozone layer destroying coefficient and will be prohibited in the future. Therefore, neither the low-boiling solvents nor the alternative Freons cannot be substituted for the CFC-11.

Another non-polluting type of process is a gas loading method which employs dry air or gaseous nitrogen. This method is also not applicable to the integral skin foam because of difficulty in formation of the high-density skin layer owing to non-occurrence of the aforementioned physical condensation. Further, a method using water, which evolves carbon dioxide gas by reaction with an isocyanate, as the blowing agent is not suitable because of the difficulty in obtaining a high-density skin layer in comparison with the use of CFC-11, although water is safe and causes no environmental problem. To improve the water-blowing process, a special catalyst has been investigated (Japanese Patent Application Laid-Open Nos. Hei-3-32811 and Hei-3-33120). This improved process, however, is not satisfactory for obtaining a sufficiently high density of the skin layer, and involves the problem of low productivity owing to delayed demolding times.

Accordingly, a technique is strongly needed to produce a polyurethane foam having a high-density skin layer in high productivity without environmental pollution.

The inventors of the present invention have investigated comprehensively the use of water alone as the blowing agent, without use of any halogenated hydrocarbon, for producing a polyurethane integral skin foam. As a result, the inventors have found that use of a guanidine type amine compound and/or its organic acid addition salt makes the density of the skin layer high and advances the mold release time, and have completed the present invention on the basis of this finding.

SUMMARY OF THE INVENTION

The present invention provides a process for producing polyurethane integral skin foam in high yield by use, as the blowing agent, of water alone with no halogenated hydrocarbon.

The present invention provides a process for producing a polyurethane foam having a high-density skin layer by reacting a polyol with a polyisocyanate in the presence of a blowing agent, a catalyst, and optionally an additive, the blowing agent being composed only of water, and the catalyst, being an amine represented by the general formula (I) below, and/or an organic acid salt thereof:

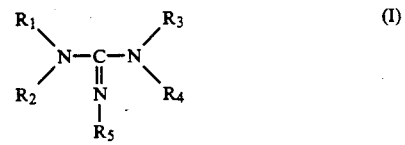

where $R_1$, $R_2$, $R_3$, and $R_4$ are, independently, an alkyl group of 1 to 12 carbons, or $R_1$ and $R_2$, and/or $R_3$ and $R_4$ may be linked to form a ring together with the adjacent nitrogen atom; and $R_5$ is hydrogen, an alkyl group of 1 to 12 carbons, a phenyl group, or a cycloalkyl group.

DETAILED DESCRIPTION OF THE PREFERRED EMBODIMENTS

The process of the present invention for producing a polyurethane foam having a high-density skin layer comprises mixing a polyisocyanate with a polyol premix containing a polyol, a catalyst, water, and optionally an additive, and injecting the resulting liquid mixture into a mold to expand the mixture.

The catalyst employed is a guanidine type amine represented by the general formula (I) and/or an organic acid addition salt thereof:

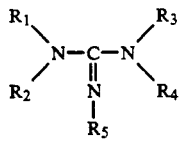

where $R_1$, $R_2$, $R_3$, and $R_4$ are as defined above. Preferably, $R_1$, $R_2$, $R_3$, and $R_4$ are, independently, alkyl groups of 1-8 carbon atoms, more preferably 1-6 carbon atoms. When $R_1$ and $R_2$ or $R_3$ and $R_4$ form a ring together with the adjacent nitrogen atom, the ring is preferably a 5-8 membered ring, more preferably a 5-6 membered ring containing 1-3 nitrogen atoms. When $R_1$ and $R_2$ or $R_3$ and $R_4$ form a ring together with the adjacent nitrogen atom, one ring nitrogen atom will, of course, be contributed by the adjacent nitrogen atom. $R_5$ is preferably an alkyl group of 1-8, preferably 1-6 carbon atoms, a cycloalkyl group of 5-8 carbon atoms or hydrogen.

The guanidine type amine includes N,N,N',N'-tetramethylguanidine, N,N,N',N',N"-pentamethylguanidine, N,N,N',N'-tetramethyl-N"-cyclohexylguanidine, N,N-diethyl-N',N'-dimethylguanidine, N,N-diethyl-N',N'-dimethyl-N"-methylguanidine, and N,N-diethyl-N',N'-dimethyl-N"-cyclohexylguanidine. Of the above amines, N,N,N', N'-tetramethylguanidine is preferred.

Such a guanidine type amine compound hydrolyzes gradually and loses its catalytic activity in the presence of water. Accordingly, the amine, when used with water as the blowing agent as in the present invention, exhibits catalytic activity for a short time after mixing into the polyol premix. This short activity is offset by using the guanidine type amine in a form of a salt of an organic acid. Suitable organic acids include aliphatic saturated carboxylic acids, aliphatic unsaturated carboxylic acids, aromatic carboxylic acids, and amino acids. Preferably, the acids having an acid dissociation constant, pKa, of from 3 to 6. Specific examples include formic acid, acetic acid, 2-ethylhexanoic acid, oleic acid, acrylic acid, crotonic acid, citric acid, adipic acid, succinic acid, benzoic acid, 4-aminobutyric acid, and the like. Of these, higher fatty acid salts such as 2-ethylhexanoic acid and oleic acid are preferred because of the higher catalytic activity. Weaker acids having an acid dissociation constant (pKa) of higher than 6 do not inhibit the hydrolysis, causing gradual hydrolysis of the catalyst amine and loss of catalyst activity. On the other hand, strong acids having an acid dissociation constant (pKa) of lower than 3 such as hydrochloric acid and dichloroacetic acid, inhibit the hydrolysis, but the salts have low catalytic activity.

The amount of the catalyst used in the process of the present invention is generally in the range of from 0.02 to 10 parts by weight per 100 parts by weight of the polyol. A larger amount of the catalyst raises the reactivity of the system and advances the demolding time, but is less economical, while a smaller amount of the catalyst delays the demolding time. Therefore, the catalyst is preferably used in the range of 0.5 to 5.0 parts by weight relative to 100 parts by weight of the polyol.

A known cocatalyst such as a tertiary amine and/or an organic acid salt thereof, and an organometallic compound may be used in an account such that the function of the catalyst of the present invention is not impaired. Suitable amine cocatalysts include triethylenediamine, 1-methyl-4-(2-dimethylaminoethyl)piperazine, 1-methyl-4-(2-hydroxyethyl) piperazine, bis(2-dimethylaminoethyl)ether, tetramethylhexamethylenediamine, 1-methylimidazole, 1,2-dimethylimidazole, 1-isobutyl-2-methylimidazole, and tris(dimethylaminopropyl)hexahydro-s-triazine, and organic acid salts thereof. These amines improve the moldability in the process of the present invention.

The organometallic compound cocatalyst includes for example, organotin compounds and alkali metal salts of carboxylic acids; such as di($C_{3-10}$ alkyl)tin di($C_{2-15}$ alkanoate)s and lithium, sodium and potassium $C_{2-15}$ alkanoates, e.g., dibutyltin diacetate, dibutyltin dilaurate, dioctyltin dilaurate, dibutyltin bis(isooctylmercaptoacetate), potassium acetate, potassium 2-ethylhexanoate, etc. In particular, in the process of the present invention, the organotin compound advances the demolding time.

Any of the above cocatalysts may be combined with any of the guanidine type amine compounds and/or the salts thereof of the present invention. The combinations of a guanidine type amine and/or its organic acid salt with an amine cocatalyst are preferred. Further, addition of an organotin compound to the above combination, namely combinations of three components are more preferred, for producing a foam having a skin layer of higher density, produced in a short time with high moldability. The ratio of the three components in the combination is 1 part by weight of the guanidine type amine and/or its organic acid salt, 0.1 to 5.0 parts by weight of the amine cocatalyst, and 0 to 0.5 part by weight of the organotin compound.

As the blowing agent, water, which evolves carbon dioxide on reaction with isocyanate, is solely used in the present invention. The amount of water to be used depends on the density of the intended product, a larger amount of water giving a lower density product, and a smaller amount of water giving a higher density product. The water is usually used in an amount of 5% by weight or less relative to 100 parts by weight of the polyol.

Known aromatic polyisocyanates are useful as the polyisocyanate in the process of the present invention. The known aromatic polyisocyanates includes toluene diisocyanate, diphenylmethane-4,4'-diisocyanate, and polymeric isocyanates thereof; isocyanate-terminated prepolymers derived by reaction of the above isocyanate with a polyol, e.g., toluene diisocyanate prepolymers, and diphenylmethane-4,4'-diisocyanate prepolymers; modified isocyanates derived by modification with carbodiimide or the like; and the mixtures of the above isocyanates. Highly reactive polyisocyanates are preferred, such as diphenylmethane-4,4'-diisocyanate, polymeric isocyanates thereof, and isocyanate-terminated prepolymers thereof, modified isocyanates thereof, and mixed polyisocyanates thereof, for advancing the mold release time. Aliphatic isocyanates and alicyclic isocyanates are slightly less reactive and require slightly longer demolding times.

Known polyols and crosslinking agents, and optionally an additive such as a foam stabilizer, may be used in the process of the present invention.

The polyol includes polyetherpolyols, polymer polyols, and polyesterpolyols having two or more reactive hydroxyl groups. The polyetherpolyols include addition products prepared by adding ethylene oxide or propylene oxide to an active hydrogen compound such as a polyhydric alcohol, e.g., glycol, glycerin, pentaerythritol, sucrose, etc.; ammonia; an aliphatic polyamine, e.g., ethylenediamine, etc.; an aromatic amine, e.g., toluene diamine, diphenylethane-4,4'-diamine, etc.; and mixtures thereof. The polymer polyols include reaction products prepared by reacting the above polyetherpolyol with an ethylenically unsaturated monomer, e.g., butadiene, acrylonitrile, styrene, etc. in the presence of a radical polymerization catalyst. The polyesterpolyols include reaction products of a dibasic acid with a polyhydric alcohol, e.g., polyethylene adipates and polyethylene terephthalates, which may be regenerated products derived from waste materials. For relatively elastic flexible foams and semi-rigid foams, two- to three-functional polyols are preferably used, and for relatively less elastic rigid foams, three- or more-functional polyols are preferably used.

Suitable crosslinking agents include known two- or more functional low molecular weight polyols, i.e. polyols such as ethylene glycol, diethylene glycol, butanediol, trimethylolpropane, and glycerin; and amine type low molecular weight polyols such as triethanolamine and diethanolamine. These low molecular weight polyols may be used singly or in combinations of two or more.

The foam stabilizer includes nonionic surfactants such as organopolysiloxane-polyoxyalkylene copolymers, silicone-glycol copolymers, and mixtures thereof, and is used optionally. The amount to be used is not specially limited, but is usually in the range of from 0 to 2.5 parts by weight per 100 parts by weight of the polyol.

Other known additives may be added in the present invention, if necessary. The known additives include flame retardants, colorants, fillers, antioxidants, and ultraviolet light absorbers.

The mixing ratio of the polyol premix to the polyisocyanate, namely the index number, is in the range of from 60 to 150, preferably from 80 to 120. The resulting liquid mixture is blended by a blowing machine, and then injected into a mold and blown therein. Thereafter the foamed product is released from the mold. Either a high-pressure blowing machine or a low-pressure blowing machine may be used. High-pressure blowing machines having high mixing performance, are preferred. The liquid mixture is injected into the mold, in a so-called over-packing state. A higher over-packing ratio provides a higher density skin layer.

The mold may be an open mold, a closed mold, or a RIM. The RIM is preferred because it enables shorter demolding times. A lower mold temperature gives a higher density skin layer. However, the lower temperature of the mold lowers the resin formation velocity, and requires a longer time before the demolding. Therefore, the temperature is preferably in the range of from 30° to 60° C.

Examples of the products produced by the process of the present invention are exterior and interior materials for automobiles such as steering wheels, instrument panels, head rests, arm rests, door panels, air spoilers, bumpers, and other structural foams as structural materials.

The novel process of the present invention gives, without destruction of the global environment, products having the same properties at the same productivity as the products of conventional processes which employ a halogenated hydrocarbon.

The present invention is described in more detail by reference to examples without limiting the invention in any way.

EXAMPLES

Examples 1-6, and Comparative Examples 1-6

Foaming tests were conducted by changing the catalyst in the material mixing ratios (namely the formulations) below. In Example 1, the water was used in an amount of 0.8 parts by weight to produce a foam of relatively low density. In Example 2, the water was used in an amount of 0.5 parts by weight and larger amount of the liquid was injected into the mold to produce a foam of higher density. In Example 3, the mold temperature was set at 50° C. which is higher by 10° C. than in Example 1. In Examples 4 to 6 and Comparative Examples 1 to 5, the foaming conditions were the same as in Example 1 except for the catalyst. In each Example, the catalyst was used in such an amount that the same reaction rate (rise time of about 60 seconds) was obtained.

The resulting foams were evaluated in a manner described below. The results are shown in Table 1.

| (a) Formulation | |
|---|---|
| Polyol*1 | 100 parts by weight |
| water | 0.5 or 0.8 parts by weight |
| crosslinking agent*2 | 8.0 parts by weight |
| Catalyst*3 | See Table 1 |
| Isocyanate*4 | (NCO/OH = 1.05) |

*1Three-functional polyetherpolyol, OHV = 33 mg KOH/g (FA-703, made by Sanyo Chemical Industries, Ltd.)
*2Ethylene glycol (made by Nisso Yuka K.K.)
*3Catalyst, and abbreviation thereof in Tables
TMG: N,N,N',N'-tetramethylguanidine
PMG: N,N,N',N',N"-pentamethylguanidine
CHMG: N,N,N',N'-tetramethyl-N"-cyclohexylguanidine
L33E: 33% triethylenediamine solution in ethylene glycol (TEDA-L33E, made by Tosoh Corporation)
POLYCAT-41: tris(dimethylaminopropyl)hexahydro-S-triazine (made by Air Products Co.)
POLYCAT-42: mixture of tris(dimethylaminopropyl)-hexahydro-S-triazine and organometal salt (made by Air Product Co.)
NMIZ: N-methylimidazole
DBU: phenol salt of 1,8-diazabicyclo[5.4.0] undecene-7 (U-CATSAI, made by Sun Apro K.K.)
*4Crude MDI: MR-200 (NCO concentration: 31.0%, made by Nippon Polyurethane Industry Co., Ltd.)

(b) Foaming conditions
Raw material liquid temperature: 25°±1° C.
Stirring: 6000 rpm (6 seconds)
(c) Measurement items
 1. Free foaming
 A reaction liquid mixture was poured into a 500 ml polyethylene cup and the mixture was allowed to foam. The reactivity was evaluated by the following criteria.
 Cream time: length of time before initial foam rising (seconds)
 Gel time: length of time for resinification (or threading; seconds)
 Rise time: length of time before stoppage of rising (seconds)
 2. Mold foaming
 A liquid reaction mixture was poured into a temperature-controlled aluminum mold having inside dimensions of 15 cm×20 cm×1 cm, then immediately the mold was closed with a top cover, and foaming was allowed to proceed. Four minutes later, the foamed product was released from the mold, and the following items were evaluated.

Mold releasability: Foam hardness (Shore C) of the released product was measured and compared after 4 minutes of foaming in the mold.

Final hardness: One day after the foaming, the hardness (Shore C) was measured and compared.

Foam density: Samples were taken from three spots in central portion of the foam, and the average density was calculated from the dimension and the weight of the samples as the overall density of the foam. Two samples having a size of 2.5 mm of the skin layer (top face and bottom face) were cut out and the average of the densities were calculated as the skin layer density. Core density was calculated from the central foam portion after removal of the skin layer. A large difference between the densities of the skin layer and the central portion means a higher density ratio for the skin layer.

As shown in Tables 1-1 and 1-2, the foams produced by use of the catalyst of the present invention had high hardness after demolding, and had a skin layer of high density in comparison with the foams produced by use of the catalyst of the Comparative Examples.

Examples 7-10, and Comparative Examples 6-9

The catalysts prepared by reacting 1 mol of TMG (tetramethylguanidine) with 1 mol of an acid, and TMG itself were tested for storage stability in a polyol premix. The abbreviations of the catalyst salts, the compositions thereof, and the method of the storage stability test are described below. The test results are shown in Table 2.

1. Preparation of TMG-acid salt catalyst

A predetermined amount of TMG and ethylene glycol (EG) or water as the solvent were placed in a 300 ml round bottom flask. The acid was added thereto with stirring to obtain the TMG-acid salt catalyst. The compositions of the catalysts are shown below. The numerals indicate percentages by weight.

TMG-FA: TMG 40.0; formic acid (95%) 17.0; EG 43.0
TMG-AA: TMG 40.0; acetic acid 20.9; EG 39.1
TMG-HA: TMG 30.0; 2-ethylhexanoic acid 37.6; EG 32.4
TMG-P: TMG 35.0; phenol 28.6; EG 36.4
TMG-C: TMG 40.0; carbon dioxide 15.3; EG 34.7; water 10.0
TMG-DA: TMG 30.0; dichloroacetic acid 33.6; EG 36.4
TMG-CA: TMG 30.0; hydrochloric acid 9.5; EG 43.6; water 16.9

2. Test method for storage-stability

TMG or the above TMG-acid salt catalyst was added to a formulation having the same composition as in Example 1 (polyol 100 parts by weight; water 0.8 parts by weight; and ethylene glycol 8 parts by weight) in an amount shown in Table 2 to prepare a premix. The premix was subjected to the foaming test immediately after preparation and after storage for 6 days in an oven at 50° C. to measure the reactivity, whereby the activity and the stability of the catalysts were compared.

As shown in Table 2, TMG exhibited decreased activity after 6 days of storage, showing less stability. The formate, acetate and 2-ethylhexanoate of TMG had activity almost unchanged after the storage, showing high stability. On the other hand, the TMG salts of carbonic acid and phenol which have an acid dissociation constant (pKa) of higher than 6 exhibited low activity, showing less stability. The TMG salts of hydrochloric acid and dichloroacetic acid exhibited low catalytic activity, and could not serve as the catalyst.

Example 11-18, and Comparative Example 10-12

With the same formulation as in Example 2, the foaming test was conducted by use of the combined system of the TMG-HA or TMG-FA with an amine cocatalyst or an organotin compound. In the test, the amount of the catalyst was increased to raise the reactivity, and demolded after 2 minutes. The moldability of the resulting foam was evaluated with the evaluation standard shown below. The results are shown in Table 3. The chemical names of the amine cocatalysts and organotin compounds used and abbreviation thereof are shown below.

1. Evaluation standard
⊚: no void found
◯: a few voids found
△: voids found
X: many voids found 2. Catalyst and abbreviation thereof
TMNAEP: 1-methyl-4-(2-dimethylaminoethyl)piperazine (TOYOCAT-NP, made by Tosoh Corporation)
MHEP: 1-methyl-4-(2-hydroxyethyl)piperazine (TOYOCAT-HP, made by Tosoh Corporation)
BDAEE: 70 wt. % solution of bis(2-dimethylaminoethyl)ether in dipropylene glycol (TOYOCAT-ET, made by Tosoh Corporation)
DBTDL: dibutyltin dilaurate (TEDA-T411, made by Tosoh Corporation)
DBTM: Dibutyltin bis(isooctylmercaptoaceate) (TEDA-T40S, made by Tosoh Corporation)

As shown in Table 3, the foams prepared with the catalyst of the present invention had high hardness after mold release, high moldability, and higher-density skin layer.

Obviously, numerous modifications and variations of the present invention are possible in light of the above teachings. It is therefore to be understood that within the scope of the appended claims, the invention may be practiced otherwise than as specifically described herein.

TABLE 1-1

| | Example No. | | | | | |
|---|---|---|---|---|---|---|
| | 1 | 2 | 3 | 4 | 5 | 6 |
| Water part (by weight)*1 | 0.8 | 0.5 | 0.8 | 0.8 | 0.8 | 0.8 |
| Catalyst | | | | | | |
| Catalyst name | TMG | TMG | TMG | PMG | CHMG | TMG/L33E |
| parts (by weight)*1 | 0.60 | 0.65 | 0.60 | 0.47 | 0.72 | 0.3/0.5 |
| Reactivity | | | | | | |
| Cream time (sec) | 19 | 20 | 19 | 18 | 20 | 17 |
| Gel time (sec) | 42 | 39 | 42 | 41 | 43 | 38 |
| Rise time (sec) | 60 | 58 | 60 | 59 | 62 | 59 |

TABLE 1-1-continued

| | Example No. | | | | | |
|---|---|---|---|---|---|---|
| | 1 | 2 | 3 | 4 | 5 | 6 |
| Mold foaming | | | | | | |
| Mold temperature (°C.) | 40 | 40 | 50 | 40 | 40 | 40 |
| Mold releasability (Shore C) Hardness at mold release (released after 4 min) | 43 | 45 | 49 | 43 | 42 | 48 |
| Final hardness (Shore C) | 70 | 74 | 71 | 72 | 69 | 75 |
| Foam density (kg/cm$^3$) | | | | | | |
| Overall | 431 | 668 | 424 | 427 | 433 | 425 |
| Skin | 493 | 803 | 462 | 487 | 486 | 485 |
| Center portion | 319 | 506 | 307 | 317 | 322 | 315 |
| Density difference (skin-core) | 174 | 297 | 155 | 170 | 164 | 170 |

*[1] Parts to 100 parts by weight of polyol

TABLE 1-2

| | Comparative Example No. | | | | |
|---|---|---|---|---|---|
| | 1 | 2 | 3 | 4 | 5 |
| Water part (by weight)*[1] | 0.8 | 0.8 | 0.8 | 0.8 | 0.8 |
| Catalyst | | | | | |
| Catalyst name | L33E | POLYCAT-41 | POLYCAT-42 | NMIZ | DBU |
| parts (by weight)*[1] | 1.00 | 1.30 | 1.30 | 2.60 | 1.30 |
| Reactivity | | | | | |
| Cream time (sec) | 14 | 12 | 15 | 12 | 32 |
| Gel time (sec) | 40 | 39 | 38 | 35 | 41 |
| Rise time (sec) | 60 | 59 | 59 | 59 | 57 |
| Mold foaming | | | | | |
| Mold temperature (°C.) | 40 | 40 | 40 | 40 | 40 |
| Mold releasability (Shore C) Hardness at mold release (released after 4 min) | 32 | 39 | 32 | 30 | 5 |
| Final hardness (Shore C) | 72 | 66 | 70 | 64 | 60 |
| Foam density (kg/m$^3$) | | | | | |
| Overall | 422 | 425 | 409 | 426 | 388 |
| Skin | 460 | 447 | 444 | 467 | 458 |
| Center portion | 334 | 365 | 339 | 324 | 305 |
| Density difference (skin-core) | 126 | 82 | 105 | 143 | 153 |

*[1] Parts to 100 parts by weight of polyol

TABLE 2

| | Example No. | | | | Comparative Example No. | | | |
|---|---|---|---|---|---|---|---|---|
| | 7 | 8 | 9 | 10 | 6 | 7 | 8 | 9 |
| Catalyst | | | | | | | | |
| Catalyst name | TMG | TMG-FA | TMG-AA | TMG-HA | TMG-P | TMG-C | TMA-DA | TMG-CA |
| Parts (by weight)*[1] | 0.8 | 2.2 | 2.5 | 2.9 | 2.5 | 2.0 | 2.2 | 2.2 |
| pKa | — | 3.8 | 4.8 | 4.9 | 10.0 | 6.4 | 1.3 | below 1 |
| Reactivity just after premixing | | | | | | | | |
| Cream time (sec) | 12 | 24 | 23 | 16 | 11 | 13 | 180 | >500 |
| Gel time (sec) | 20 | 69 | 43 | 28 | 17 | 26 | 360 | — |
| Rise time (sec) | 23 | 84 | 30 | 32 | 19 | 30 | 600 | — |
| Reactivity after storage at 50° C. for 6 days | | | | | | | | |
| Cream time (sec) | 16 | 24 | 23 | 16 | 29 | 17 | 181 | >500 |
| Gel time (sec) | 40 | 69 | 42 | 29 | 55 | 38 | 357 | — |
| Rise time (sec) | 60 | 83 | 60 | 33 | 70 | 59 | 603 | — |

*[1] Parts to 100 parts by weight of polyol

TABLE 3

| | Example No. | | | | | | | | Comparative Example No. | | |
|---|---|---|---|---|---|---|---|---|---|---|---|
| | 11 | 12 | 13 | 14 | 15 | 16 | 17 | 18 | 10 | 11 | 12 |
| **Catalyst (parts by weight)*[1]** | | | | | | | | | | | |
| TMG-HA | 2.84 | 1.50 | — | 2.00 | 2.00 | 1.07 | 1.00 | 1.00 | 0.60 | — | — |
| TMG-FA | — | — | 1.30 | — | — | — | — | — | — | — | — |
| L33E | — | 0.75 | 0.92 | — | — | 0.54 | — | — | — | 0.80 | — |
| TMNAEP | — | — | — | 0.60 | — | — | 0.60 | — | — | — | — |

TABLE 3-continued

|  | Example No. | | | | | | | | Comparative Example No. | | |
|---|---|---|---|---|---|---|---|---|---|---|---|
|  | 11 | 12 | 13 | 14 | 15 | 16 | 17 | 18 | 10 | 11 | 12 |
| MHEP | — | — | — | — | 1.24 | — | — | 1.00 | — | — | — |
| BDAEE | — | — | — | — | — | 0.50 | — | — | — | — | — |
| DBTDL | — | — | — | — | — | — | 0.05 | — | 0.20 | — | 0.30 |
| DBTM | — | — | — | — | — | — | — | 0.10 | — | 0.10 | — |
| Reactivity | | | | | | | | | | | |
| Cream time (sec) | 18 | 16 | 16 | 16 | 16 | 14 | 14 | 15 | 15 | 12 | 15 |
| Gel time (sec) | 26 | 25 | 26 | 26 | 25 | 26 | 26 | 24 | 25 | 22 | 23 |
| Rise time (sec) | 31 | 31 | 32 | 30 | 30 | 31 | 33 | 28 | 29 | 25 | 26 |
| Mold foaming | | | | | | | | | | | |
| Mold temperature (°C.) | 40 | 40 | 40 | 40 | 40 | 40 | 40 | 40 | 40 | 40 | 40 |
| Mold releasibility (Shore C) Hardness at mold release (released after 2 min) | 68 | 62 | 63 | 63 | 61 | 60 | 69 | 70 | 71 | 65 | 67 |
| Final hardness (Shore C) | 83 | 84 | 79 | 80 | 79 | 76 | 80 | 79 | 82 | 80 | 80 |
| Foam density (kg/m$^3$) | | | | | | | | | | | |
| Overall | 697 | 704 | 685 | 709 | 690 | 678 | 684 | 679 | 695 | 692 | 701 |
| Skin | 855 | 813 | 809 | 818 | 811 | 782 | 810 | 810 | 819 | 767 | 771 |
| core | 519 | 522 | 521 | 523 | 518 | 505 | 509 | 507 | 512 | 524 | 525 |
| Density difference (skin-core) | 336 | 291 | 288 | 295 | 293 | 277 | 301 | 303 | 307 | 243 | 246 |
| Moldability | △ | ○ | ○ | ○ | ○ | ⊚ | ○ | ○ | X | X | X |

*[1] Parts by weight to 100 parts by weight of polyol

What is claimed as new and desired to be secured by Letters Patent of the United States is:

1. A process for producing a polyurethane foam having a high-density skin layer, comprising the steps of:
reacting a polyol with a polyisocyanate in the presence of a blowing agent and a catalyst, wherein said blowing agent consists of water, and said catalyst is an acid addition salt of an amine having formula (I) below with an organic acid having an acid dissociation constant pKa of from 3-6:

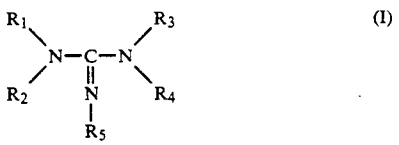

wherein $R_1$, $R_2$, $R_3$, and $R_4$ are, independently, an alkyl group of 1 to 12 carbon atoms, or $R_1$ and $R_2$, and/or $R_3$ and $R_4$ together with the adjacent nitrogen atom form a ring; and $R_5$ is hydrogen, an alkyl group of 1 to 12 carbon atoms, a phenyl group, or a cycloalkyl group.

2. The process of claim 1, wherein said polyisocyanate is an aromatic isocyanate having two or more isocyanate groups.

3. The process of claim 1, wherein $R_1$, $R_2$, $R_3$ and $R_4$ are alkyl groups of 1-8 carbon atoms.

4. The process of claim 1, wherein $R_1$, $R_2$, $R_3$ and $R_4$ are alkyl groups of 1-6 carbon atoms.

5. The process of claim 1, wherein $R_5$ is an alkyl group of 1-8 carbon atoms.

6. The process of claim 1, wherein $R_5$ is an alkyl group of 1-6 carbon atoms.

7. The process of claim 1, wherein $R_5$ is a cycloalkyl group having 5-8 carbon atoms.

8. The process of claim 1, wherein $R_5$ is hydrogen.

9. The process of claim 1, wherein said catalyst is used in a amount of from 0.02 to 10 parts by weight per 100 parts by weight of said polyol.

10. The process of claim 1, wherein said catalyst is used in an amount of from 0.5-5.0 parts weight per 100 parts by weight of said polyol.

11. The process of claim 1, wherein said catalyst further comprises a tertiary amine cocatalyst, an organic acid addition salt thereof, or mixture thereof.

12. The process of claim 1, wherein said catalyst further comprises an organometallic compound cocatalyst.

13. The process of claim 12, wherein said organometallic compound cocatalyst is an organotin compound or an alkali metal salt of a carboxylic acid.

14. The process of claim 1, wherein said catalyst further comprises a tertiary amine cocatalyst and an organotin cocatalyst, wherein the ratio of amine catalyst, tertiary amine cocatalyst and organotin cocatalyst is 1 part by weight amine catalyst and/or organic acid addition salt thereof, 0.1-5.0 parts weight of tertiary amine cocatalyst and 0-0.5 parts weight of said organotin compound cocatalyst.

15. The process of claim 1, wherein said water blowing agent is used in an amount of 5% by weight or less relative to 100 parts by weight of said polyol.

16. The process of claim 1, wherein the mixing ratio of polyol to polyisocyanate is in the range of from 60 to 150.

17. The process of claim 1, wherein the mixing ratio of said polyol to said polyisocyanate is in the range of from 80 to 120.

18. The process of claim 1, wherein said reacting is conducted at a temperature in the range of from 30°-60° C.

* * * * *